United States Patent
Fujiwara

(10) Patent No.: US 8,683,102 B2
(45) Date of Patent: Mar. 25, 2014

(54) BUS ARBITRATION APPARATUS AND BUS ARBITRATION METHOD

(75) Inventor: Makoto Fujiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/234,040

(22) Filed: Sep. 15, 2011

(65) Prior Publication Data

US 2012/0084475 A1   Apr. 5, 2012

(30) Foreign Application Priority Data

Oct. 4, 2010   (JP) .................... 2010-224956

(51) Int. Cl.
 G06F 3/00 (2006.01)
 G06F 13/36 (2006.01)
(52) U.S. Cl.
 USPC ............ 710/113; 710/29; 710/107; 710/110
(58) Field of Classification Search
 USPC .................. 710/29, 107, 110, 113
 See application file for complete search history.

(56) References Cited

U.S. PATENT DOCUMENTS

| 7,181,558 B2* | 2/2007 | Endo et al. ............... 710/113 |
| 7,685,346 B2* | 3/2010 | Teh et al. ............... 710/244 |
| 7,990,999 B2* | 8/2011 | Lee et al. ............... 370/462 |
| 8,032,678 B2* | 10/2011 | Tardieux et al. ............... 710/113 |
| 2004/0019749 A1* | 1/2004 | Mochida et al. ............... 711/151 |
| 2010/0318706 A1* | 12/2010 | Kobayashi ............... 710/114 |

FOREIGN PATENT DOCUMENTS

JP   10-326253 A   12/1998

* cited by examiner

Primary Examiner — Brian Misiura
(74) Attorney, Agent, or Firm — Canon U.S.A., Inc. IP Division

(57) ABSTRACT

It may be difficult to give bus right to a bus master that cannot output a bus request signal when a bus arbitration apparatus is ready to grant bus permission precisely in a ratio of a preset number of times of the bus acquisition. The bus arbitration apparatus operates to wait until bus request signals of bus masters that have not performed transfers of the preset number of times of the bus acquisition are output while a bus slave operates.

5 Claims, 4 Drawing Sheets

BUS ARBITRATION APPARATUS AND BUS ARBITRATION METHOD

BACKGROUND OF THE INVENTION

1. Field of the Invention

The present invention relates to a bus arbitration apparatus that sets a ratio of the number of times of bus right acquisition of bus masters.

2. Description of the Related Art

A bus arbitration apparatus has been used to decide bus-use rights for a plurality of bus masters sharing a bus. Various kinds of priority of bus-use rights for each bus master have been discussed according to uses such as an equal priority for each master and a fixed order of priorities set in advance.

Among bus arbitration apparatuses, there are discussed some bus arbitration apparatuses that can set the ratio of using the bus for each master. Japanese Patent Application Laid-Open No. 10-326253 discusses a bus arbitration apparatus capable of freely setting the ratio of number of times of acquiring bus-use rights by each bus master.

This apparatus controls the number of times of the acquisition of bus-use rights by each master by presetting the number of times of acquiring bus-use rights for each bus master and masking a bus-use request signal to the bus master whose number of times of bus-use rights being granted has reached the preset number of times.

In the conventional bus arbitration apparatus described above, the number of times of actually acquiring bus-use rights is counted by a counter corresponding to the bus master. When the number of times of bus-use rights being actually granted reaches the count preset corresponding to each bus master, the bus arbitration apparatus operates so as not to permit transfer of a bus master to which bus-use rights have been granted. If there is no bus-use request from a bus master whose number of times of bus-use rights being granted has not reached the preset count, the bus arbitration apparatus resets the counter.

The operation of the conventional bus arbitration apparatus will be described referring to FIG. 4. Behavior of a bus arbitration apparatus in a configuration in which there are four bus masters is illustrated in a timing chart in FIG. 4. Regarding the ratio of the number of times for each bus master to acquire bus-use rights, a bus master 0 and a bus master 2 have two times set thereto and the bus master 1 and a bus master 3 have one time set thereto.

Bus-use requests of the bus masters 0, 1, 3 continue to be asserted, and a bus-use request of the bus master 2 is not asserted in T0 to T7 periods and is asserted in T8 and subsequent periods. Use permission counters of each bus master in timing T0 have values preset from outside.

Then, the bus arbitration apparatus selects one bus master from bus masters whose bus-use request is asserted and provides a bus-use permission signal. In the T0 to T3 periods, the bus-use permission is given to the bus master 0, the bus master 1, the bus master 3, and the bus master 0 in this order.

In timing T4, the bus-use permission has been given to the bus masters 0, 1, 3 for the preset number of times of bus-use right acquisition and thus, new bus-use permission is not given to such bus masters as long as the counter is not reset. If a bus-use request is sent from the bus master 2 in timing T4, the bus-use permission is given to the bus master 2, but at this point, there is no bus-use request from the bus master 2.

Here, bus-use request signals after masking are all deasserted and a condition for recounting the number of times of bus-use rights being granted is satisfied and thus, the use permission counter is reset. The resetting of the use permission counter is indicated by a clear signal. The clear signal is asserted in the T4 period.

In the T5 to T7 periods, one-time bus-use permission is given to each of the bus masters 0, 1, 3. In timing T8, the bus-use request of the bus master 2 is asserted.

In T8 to T10 periods, one-time bus-use permission is given to the bus master 1 and two-time bus-use permission is given to the bus master 2.

In timing T11, the bus-use permission has been given to all bus masters for the preset number of times of the bus-use right acquisition and thus, no bus-use permission is granted. Therefore, a judgment is made to reset the use permission counter to accept a new bus-use request and a clear signal is asserted.

In the T0 to T11 periods, as described above, the number of times of the acquisition of bus-use rights of each bus master is four times for the bus master 0, two times for the bus master 1, two times for the bus master 2, and two times for the bus master 3. While the bus master 2 is expected to acquire the bus as many times as the bus master 0, but actually the bus master 2 acquires bus-use rights half as many times as expected.

In a conventional bus arbitration apparatus, as described above, a bus master that cannot output a bus-use request signal when the bus arbitration apparatus is ready to grant bus-use permission may not be able to have bus-use requests granted in the ratio of the preset number of times of bus acquisition.

SUMMARY OF THE INVENTION

The present invention is directed to a bus arbitration apparatus and a bus arbitration method capable of granting bus-use rights with precision according to the preset number of times of the bus acquisition.

According to another aspect of the present invention, a bus arbitration apparatus connected to a bus to which a plurality of masters and a slave are connected includes a setting unit that sets a transfer count for each of the masters, a counter that counts a number of times of bus-use rights being granted for each of the masters, a bus-use request suppression unit that suppresses bus-use requests from the masters according to a value of the counter, a selection unit that selects a bus-use request to which the bus-use rights should be given from among the bus-use requests suppressed by the bus-use request suppression unit, and a control unit that controls timing to set the counter according to a state of the slave.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
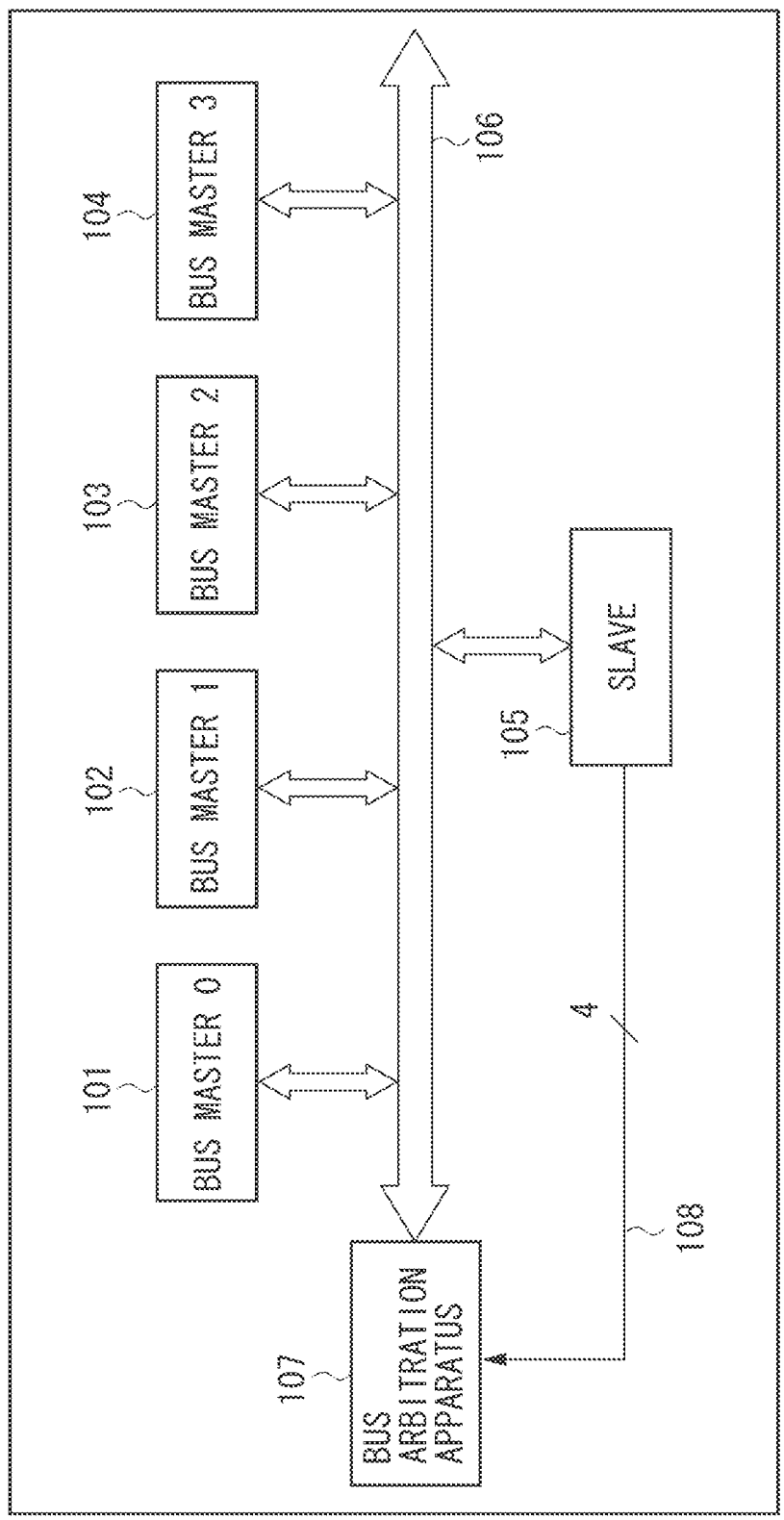
FIG. 1 is a schematic diagram illustrating a configuration of a system into which a bus arbitration apparatus is incorporated.

FIG. 1 is a schematic diagram illustrating a configuration of a system into which a bus arbitration apparatus, which is an exemplary embodiment of the present invention, is incorporated.

In a bus system according to the present exemplary embodiment, four bus master modules 101 to 104 (hereinafter, referred to simply as bus masters) connected to a bus 106 perform a bus transfer to a slave module 105 (hereinafter, referred to simply as a slave) connected to the same bus 106. The bus system is configured to conduct arbitration of bus-use rights when a plurality of bus-use requests is issued from a plurality of bus masters to cause a bus conflict, In a bus system according to the present exemplary embodiment, the bus master that has issued a use request is configured to be able to continue to issue a bus-use request without waiting for a response from the slave. The bus master and the slave are configured in a common way and thus, a description thereof is omitted. Therefore, the bus 106 separately has a command bus to transfer addresses and transfer attributes (such as an access type and transfer direction), and a data bus to transfer data.

The slave 105 internally has a command queue to store a plurality of transfer commands received from each bus master. The slave 105 also has a queue state notification signal (line) 108 to be able to notify the bus arbitration apparatus 107 of the state of the command queue. The queue state notification signal 108 notifies the bus arbitration apparatus 107 of the number of transfer commands stored in the command queue of the slave 105.

Figure 2:
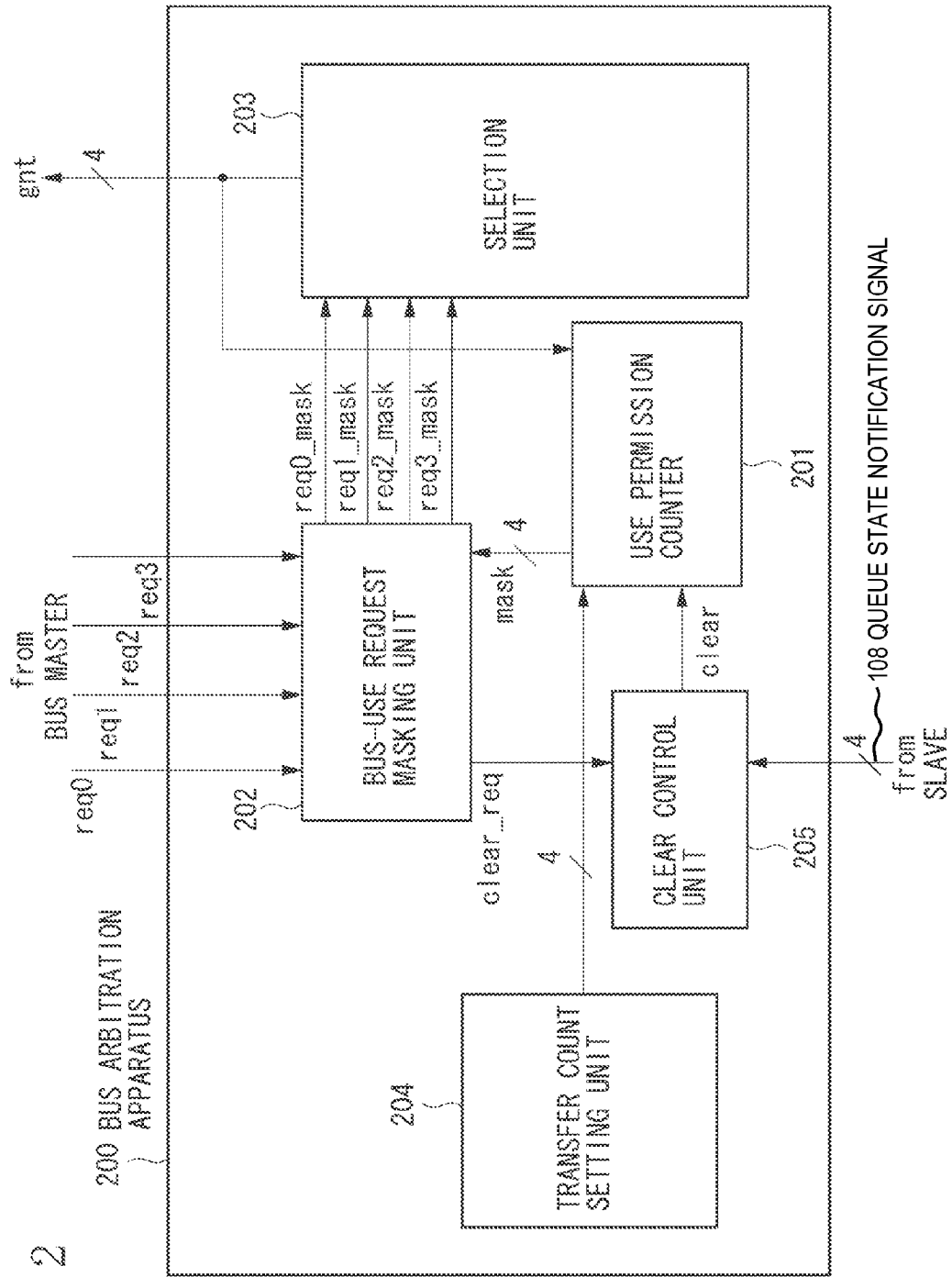
FIG. 2 is a schematic diagram illustrating the bus arbitration apparatus.

FIG. 2 is a schematic diagram illustrating a configuration of a bus arbitration apparatus 200 according to a first exemplary embodiment. The bus arbitration apparatus 200 includes a use permission counter 201, a bus-use request masking unit 202, a selection unit 203, a clear controller 205, and a transfer count setting unit 204 that sets and holds the number of times of the bus-use right acquisition of each bus master. Units illustrated in FIG. 2 each include a logic circuit, and arrows connecting the units each indicate a signal, a transmission direction thereof, and a number of bits.

The use permission counter 201 monitors a gnt signal, which is a bus transfer permission signal output by the selection unit 203, to count for each bus master the number of times of bus-use rights being granted by the selection unit 203. Then, the use permission counter 201 notifies the bus-use request masking unit 202 of a mask signal to mask a bus-use request signal of any bus master that has reached the number of times of the transfer preset in the transfer count setting unit 204.

When the transfer count of each bus master reaches the number of times of the transfer preset in the transfer count setting unit 204, the bus-use request masking unit 202 issues a clear request signal to reset the counter to the clear controller. Then, the use permission counter 201 resets the counter thereof based on a clear signal issued by the clear controller 205 in response to the clear request signal.

If a clear_req signal, which is a clear request signal, is asserted and the state indicated by the queue state notification signal 108 received from the slave notifies that the number of transfer commands stored in the command queue is 0 (the slave is not operating), the clear controller 205 asserts the clear signal.

The bus-use request masking unit 202 receives a mask signal from the use permission counter 201 to mask (shield, suppress) a bus-use request signal corresponding to the mask signal. More specifically, even if a bus-use request signal of the bus master corresponding to a mask signal is asserted, bus-use request signals (req0_mask to req3_mask) after masking are not asserted.

The selection unit 203 is notified of the bus-use request signals (req0_mask to req3_mask) after masking of each bus master and if the bus-use request signals (req0_mask to req3_mask) after masking are all deasserted, the bus-use request masking unit 202 asserts a clear_req signal to request a resetting of the use permission counter.

Based on the bus-use request signals (req0_mask to req3_mask) after masking received from the bus-use request masking unit 202, the selection unit 203 selects the bus master to which bus-use rights should be given by a predetermined method (such as the fixed priority method and round-robin).

In the present exemplary embodiment, it is assumed that priorities are given in the order of the bus masters 0, 1, 2, 3 or bus masters are cyclically selected in the order of the bus masters 0, 1, 2, 3. Then, the selection unit 203 notifies the selected bus master of bus-use rights given thereto by using a bus transfer permission signal (gnt).

The transfer count setting unit 204 is a register group that sets an operation of the bus arbitration apparatus, and has the transfer count of each bus master set by a CPU (not illustrated) or the like from outside. If, for example, the bus master 0 and the bus master 1 should be operated in such a way that the ratio of transfer reception counts thereof should be 1:2, one time is set to the bus master 0 and two times to the bus master 1.

Figure 3:
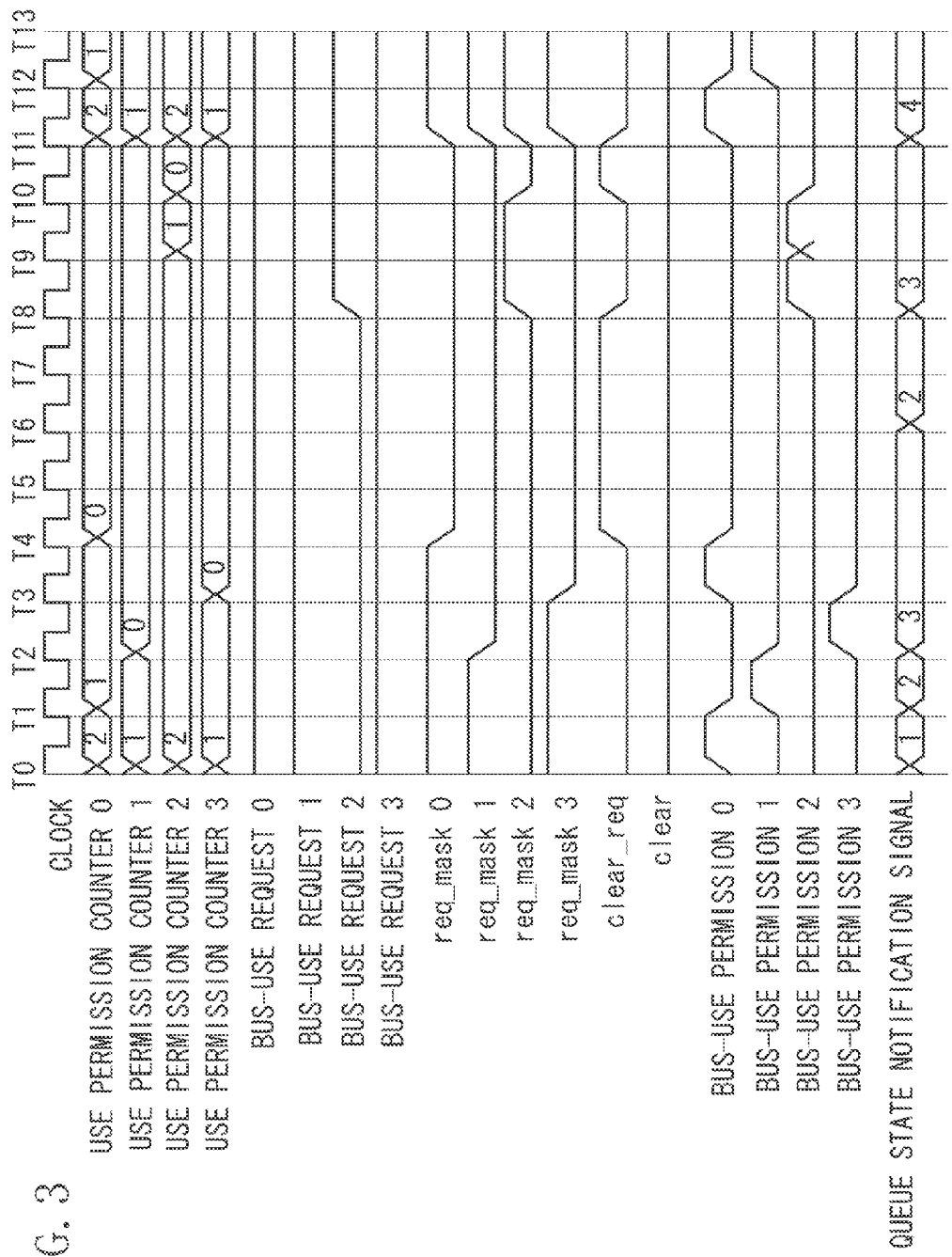
FIG. 3 is a timing chart of bus arbitration processing according to a first exemplary embodiment.
Figure 4:
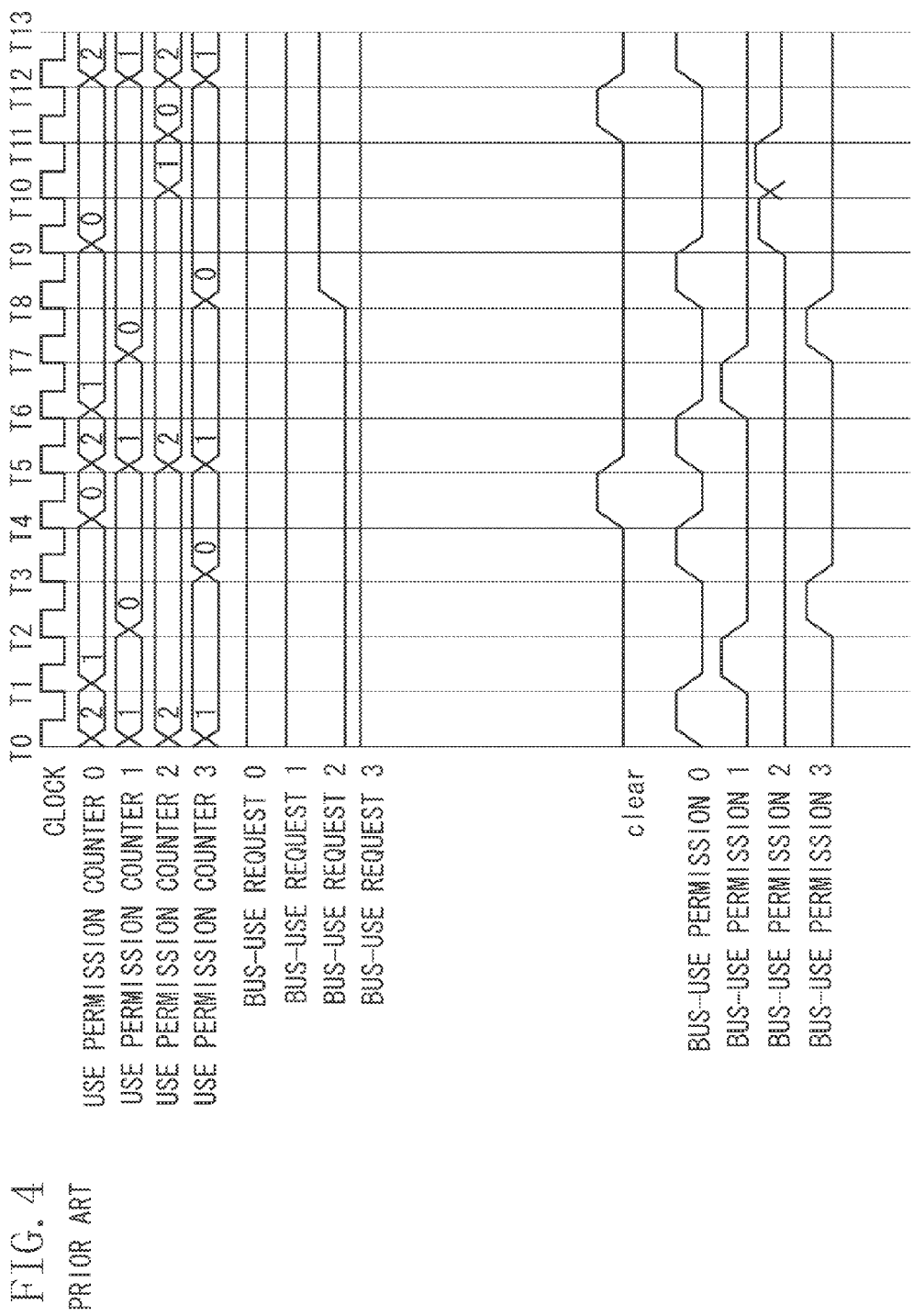
FIG. 4 is a timing chart of conventional bus arbitration processing.

Next, the operation in the present exemplary embodiment will be described referring to the timing chart of bus arbitration in FIG. 3. FIG. 3 illustrates a timing chart of a bus arbitration apparatus configured to have four bus masters and in which the ratio of the number of times of acquiring bus-use rights is set in such a way that two times are set to the bus masters 0, 2 and one time is set to the bus masters 1, 3.

Bus-use requests of the bus masters 0, 1, 3 continue to be asserted and a bus-use request of the bus master 2 is not asserted in T0 to T7 periods, and is asserted in T8 and subsequent periods. Use permission counters of each bus master in timing T0 have values preset from outside. As illustrated in FIG. 3, the bus masters 0, 1, 2, 3 have two times, one time, two times, and one time set thereto, respectively. In timing T0, the bus-use is requested from the bus masters 0, 1, 3.

The bus arbitration apparatus 200 gives the bus-use permission to the bus master 0 in timing T0, to the bus master 1 in timing T1, to the bus master 3 in timing T2, to the bus master 1 in timing T3, and to the bus master 1 in T3 period. According to the bus-use permission being granted by the selection unit 203, the use permission counter 201 decrements the use permission counter of the relevant bus master. If the use permission counter becomes 0, a bus-use request signal of the relevant bus master is masked by the bus-use request masking unit 202 based on a notification from the use permission counter 201.

In timing T4, bus-use requests are asserted from the bus masters 0, 1, 3, but use permission counters of the relevant bus masters are 0 and thus, req_mask signals (req0_mask, reg1_mask, req3_mask), which are bus-use request signals after masking, are masked.

Moreover, in timing T4, there is no bus-use request from the bus master 2. Simultaneously in timing T4, a clear_req signal requesting a resetting of the use permission counter 201 is asserted from the bus-use request masking unit 202.

In the present exemplary embodiment, even if the clear_req signal is asserted, the clear controller 205 does not assert a clear signal to reset the counter immediately. The queue state notification signal 108 indicates the number of used stages in the command queue of the slave.

"1" is added thereto if bus-use permission is granted and "1" is subtracted therefrom if one transfer received inside the slave is completed. The number does not change if bus-use permission is granted and at the same time, one transfer by the slave is completed. The queue state notification signal 108 that is not 0 indicates that the slave is performing a transfer received from each bus master.

If settings are made so that the use permission counter is not reset until the queue state notification signal 108 becomes 0, as illustrated in FIG. 3, the clear signal is not asserted and the use permission counter is not reset in T4 to T7 periods.

In timing T8, there is a bus-use request from the bus master 2 and bus-use by the bus master 2 is permitted consecutively in timing T9 and T10.

In timing T10, use permission counters of all masters become 0 and in timing T11, the use permission counters are reset.

In the timing chart in FIG. 3, the clear signal is not asserted. If the clear_req signal is asserted and the queue state notification signal become 0 in the T4 to T7 periods, the clear controller 205 asserts the clear signal that resets the use permission counter. This is intended to avoid a state in which a bus-use request of a bus master from which there is no bus-use request continues to be awaited.

According to a bus arbitration apparatus in the present exemplary embodiment, as described above, clearing of the use permission counter is controlled according to the slave state, and therefore bus-use counts of each bus master can be granted as preset.

Incidentally, the present invention does not limit conditions for resetting the use permission counter to those under which the queue state notification signal becomes 0. For example, the use permission counter may be reset when the queue state notification signal falls to a preset number (value) or below. In this case, even if a slave that requires a time to actually start a transfer after the transfer being received is used, a system in which the time in which the slave stops operating is short so that the bus can be used more efficiently can be configured.

The present exemplary embodiment is described by taking an example in which the use permission counter is configured by a down-counter, but the use permission counter can also be configured by an up-counter.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-224956 filed Oct. 4, 2010, which is hereby incorporated by reference herein in its entirety.

What is claimed is:

1. A bus arbitration apparatus connected to a bus to which a plurality of masters and a slave are connected, comprising:
   a setting unit configured to set a number of times of transfer for each of the masters;
   a counter configured to count a number of times of bus rights being granted for each of the masters;
   a bus request suppression unit configured to suppress bus requests from the masters according to a value of the counter;
   a selection unit configured to select a bus request to which the bus right should be given from among the bus requests suppressed by the bus request suppression unit; and
   a control unit configured to control so that resetting of the counter is awaited while the slave operates.

2. The bus arbitration apparatus according to claim 1, wherein the counter counts the number of times of the bus rights being granted of the masters that have not performed transfers, corresponding to the number of times of the transfer set by the setting unit.

3. The bus arbitration apparatus according to claim 1, wherein the control unit monitors a number of used stages of a command queue holding transfer commands received by the slave and, if the number of used stages of the command queue falls to a preset number or below and there is no bus request from the masters to which the bus rights have not been given as many times as a preset number of times of the bus right acquisition, the control unit performs control to set the counter.

4. The bus arbitration apparatus according to claim 1, wherein the bus request suppression unit is a circuit that masks the bus request from at least one of the masters according to the value of the counter, and the selection unit selects the bus request to which the bus right should be given from among the bus requests masked by the bus request suppression unit.

5. A bus arbitration method by a bus arbitration apparatus connected to a bus to which a plurality of masters and a slave are connected and including a counter configured to count a number of times of bus right being granted for each of the masters, the method comprising:
   setting a number of times of transfer for each of the masters;
   counting a number of times of bus right being granted for each of the masters by the counter;
   suppressing bus requests from the masters according to the counted value;
   selecting a bus request to which the bus right should be given from among the suppressed bus requests; and
   controlling so that resetting of the counter is awaited while the slave operates.

* * * * *